(12) United States Patent
Noack et al.

(10) Patent No.: US 7,601,202 B2
(45) Date of Patent: Oct. 13, 2009

(54) METHOD AND DEVICE FOR REDUCING THE CARBON DIOXIDE CONCENTRATION IN AIR

(75) Inventors: Andreas Noack, Mainz (DE); Jürgen Kunstmann, Bad Soden (DE); Christian Gnabs, Kelkheim (DE); Norman Bischofberger, Guntersblum (DE); Norbert A. Paul, Darmstadt (DE); Jörg Rathenow, Epstein (DE)

(73) Assignee: Blue Membranes GmbH, Wiesbaden (DE)

( * ) Notice: Subject to any disclaimer, the term of this patent is extended or adjusted under 35 U.S.C. 154(b) by 433 days.

(21) Appl. No.: 11/176,611

(22) Filed: Jul. 7, 2005
(Under 37 CFR 1.47)

(65) Prior Publication Data
US 2008/0127821 A1 Jun. 5, 2008

Related U.S. Application Data

(63) Continuation-in-part of application No. PCT/EP03/07533, filed on Jul. 11, 2003.

(30) Foreign Application Priority Data
Jan. 7, 2003 (DE) ................................ 103 00 141

(51) Int. Cl.
*B01D 53/22* (2006.01)
*B01D 71/02* (2006.01)
*B01D 53/04* (2006.01)

(52) U.S. Cl. .................. 95/51; 95/12; 95/54; 95/130; 95/139; 95/236; 96/4; 96/7; 96/9; 96/10; 96/134; 96/143; 96/243; 96/417; 55/385.2; 55/385.4

(58) Field of Classification Search .................... 95/8, 95/12, 45, 51, 54, 130, 139, 236; 96/4, 7, 96/8, 9, 10, 108, 134, 143, 243, 417; 55/385.2, 55/385.4
See application file for complete search history.

(56) References Cited

U.S. PATENT DOCUMENTS 3,369,343 A * 2/1968 Robb .......................... 95/51

(Continued)

FOREIGN PATENT DOCUMENTS

DE 3842930 A1 6/1990

(Continued)

OTHER PUBLICATIONS

Patent Abstract of Japan, JP 2737281.

*Primary Examiner*—Jason M Greene
(74) *Attorney, Agent, or Firm*—Frommer Lawrence & Haug LLP; Thomas J. Kowalski; Heidi E. Lunasin

(57) ABSTRACT

The invention relates to a method for reducing the carbon dioxide concentration in air of a closed or partially closed unit of space. The inventive method may comprise the steps of removing an air flow from the unit of space, guiding the air flow in a membrane system that may contain at least one membrane module having a $CO_2/O_2$ selectivity of greater than 2, removing the carbon dioxide permeated through the membrane, and returning the air flow that has been depleted of carbon dioxide in the membrane system to the unit of space. The inventive method may be optionally combined with an oxygen enrichment method. The invention also relates to corresponding devices for carrying out the inventive method.

17 Claims, 1 Drawing Sheet

U.S. PATENT DOCUMENTS

| | | | |
|---|---|---|---|
| 4,685,939 A | 8/1987 | Kratz et al. | |
| 4,863,492 A * | 9/1989 | Doshi et al. | 95/8 |
| 4,867,766 A | 9/1989 | Campbell et al. | |
| 4,896,514 A | 1/1990 | Sugiyama et al. | |
| 5,082,471 A * | 1/1992 | Athayde et al. | 95/51 |
| 5,120,329 A * | 6/1992 | Sauer et al. | 95/8 |
| 5,158,584 A | 10/1992 | Tamura et al. | |
| 5,676,736 A * | 10/1997 | Crozel | 95/45 |
| 5,876,486 A * | 3/1999 | Steinwandel et al. | 95/51 |
| 5,890,366 A | 4/1999 | Yang | |
| 6,093,238 A | 7/2000 | Huf | |
| 6,193,785 B1 * | 2/2001 | Huf | 95/54 |
| 6,427,484 B1 | 8/2002 | Choi et al. | |
| 6,468,328 B2 * | 10/2002 | Sircar et al. | 95/130 |
| 6,582,498 B1 * | 6/2003 | Sass et al. | 95/236 |
| 6,709,483 B1 * | 3/2004 | Hodgson, Jr. | 95/51 |
| 2003/0154857 A1 * | 8/2003 | Murdoch | 95/51 |
| 2005/0284814 A1 * | 12/2005 | Mairal et al. | 95/51 |
| 2008/0173179 A1 * | 7/2008 | Tandon et al. | 95/51 |

FOREIGN PATENT DOCUMENTS

| | | |
|---|---|---|
| DE | 19518407 A1 | 11/1996 |
| DE | 195 45 764 | 2/2000 |
| DE | 19849216 A1 | 4/2000 |
| DE | 199 51 732 | 5/2001 |
| DE | 10013457 A1 | 9/2001 |
| DE | 10051910 A1 | 5/2002 |
| DE | 10233182 A1 | 7/2003 |
| EP | 0 767 139 | 7/1999 |
| EP | 0 997 164 | 5/2000 |
| GB | 2 029 257 | 3/1980 |
| JP | 60118605 A2 | 6/1985 |
| JP | 63062537 A2 | 3/1988 |
| JP | 01264905 A2 | 10/1989 |
| JP | 02221102 A2 | 9/1990 |
| JP | 03061198 | 3/1991 |
| JP | 06234505 A2 | 8/1994 |
| WO | WO0024500 A1 | 5/2000 |
| WO | WO0168533 A2 | 9/2001 |
| WO | WO0232558 A1 | 4/2002 |

* cited by examiner

METHOD AND DEVICE FOR REDUCING THE CARBON DIOXIDE CONCENTRATION IN AIR

INCORPORATION BY REFERENCE

This application is a continuation-in-part application of international patent application Serial No. PCT/EP2003/007533 filed Jul. 11, 2003, which claims benefit of German patent application Serial No. DE 10300141.7 filed Jan. 7, 2003.

The foregoing applications, and all documents cited therein or during their prosecution ("appln cited documents") and all documents cited or referenced in the appln cited documents, and all documents cited or referenced herein ("herein cited documents"), and all documents cited or referenced herein cited documents, together with any manufacturer's instructions, descriptions, product specifications, and product sheets for any products mentioned herein or in any document incorporated by reference herein, are hereby incorporated herein by reference, and may be employed in the practice of the invention.

FIELD OF THE INVENTION

The present invention relates to a method and an apparatus for reducing the carbon dioxide concentration in air in closed or partly closed units of space and if necessary, at the same time as oxygen enrichment.

BACKGROUND OF THE INVENTION

The breathing in of oxygen produces carbon dioxide as a "waste gas". Carbon dioxide is an odorless gas that occurs naturally in air in a very small proportion of 0.03 vol %. Higher carbon dioxide contents in the surrounding air have an unfavorable physiological effect on humans. As small a concentration as 0.5 vol % $CO_2$ in the surrounding air produces typical symptoms such as headache, which is why the maximal workplace concentration of $CO_2$ is set at 0.5 vol % (5000 ppm).

In closed air conditioned spaces, for example, it is desirable to be able to regulate the carbon dioxide content in the air wherein excess $CO_2$ is continuously removed from the air.

Moreover, lowering the $CO_2$ content can be advantageously combined with additional measures to improve the room climate, for example, by enrichment of the room air with oxygen as well as air conditioning.

Conventional oxygen enrichment methods for improvement of the air quality in closed air circulation systems and rooms or cabins are mostly based on pure oxygen enrichment devices such as for example pressure swing adsorption systems or hollow fiber membrane systems. Exemplary corresponding devices are described in U.S. Pat. Nos. 4,867,766; 5,890,366; 6,427,484; 5,158,584 and 4,896,514.

Some of the prior art devices identified above provide conditioning of the oxygen-enriched air. Systems have also been proposed (e.g. German Patent 195 45 764) which remove carbon dioxide with adsorbers. This technology however has the disadvantage of also simultaneously dehumidifying the air. The consequence is either very costly adsorber regeneration with hot air or vacuum as well as a separate humidification of the room air, or disposal of the used adsorber cartridges, which makes the corresponding systems uneconomical for most applications.

In order to avoid the disadvantageous physiological effects of carbon dioxide enrichment in room air stated above there is a demand for suitable methods and devices which make possible a depletion of the carbon dioxide content in room air, and can if necessary simultaneously climatize or enrich the air with oxygen.

Citation or identification of any document in this application is not an admission that such document is available as prior art to the present invention.

SUMMARY OF THE INVENTION

It was therefore one object of the present invention to make available a method and a dedicated apparatus for the regulation of the carbon dioxide content in closed or partially closed air circulation systems and rooms or cabins, including those for the depletion of carbon dioxide content, which overcome the disadvantages in the art.

It was a yet another object of the present invention to provide a method and a dedicated apparatus for the depletion of carbon dioxide from air in closed or at least partly closed units of space, which provides a simultaneous enrichment of the air with oxygen.

In yet another object of the present invention, there is a method and an apparatus, as described above, which in an inexpensive and low noise manner depletes carbon dioxide in a block of air and optionally can simultaneously permit enrichment of the air with oxygen.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

These and other embodiments are disclosed or are obvious from the encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION

Figure 1:
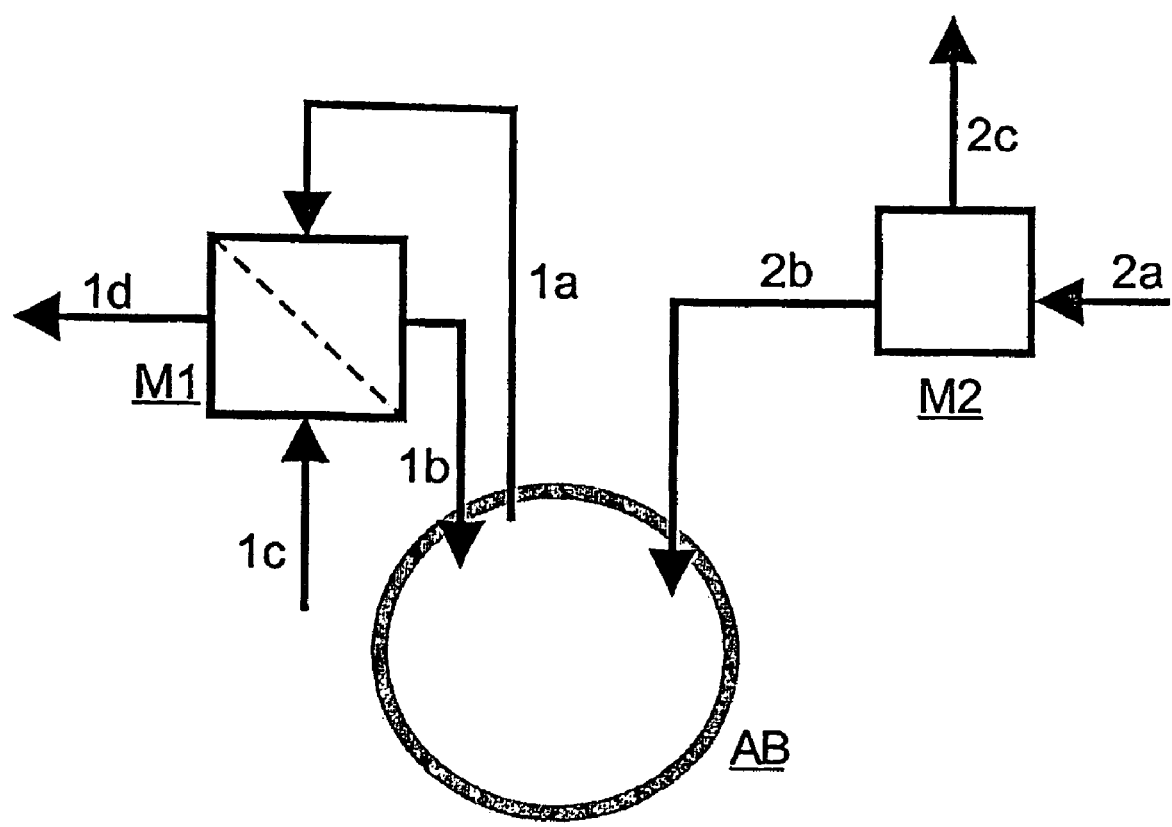
FIG. 1 illustrates a flow diagram of some of the exemplary embodiments of the invention.

In accordance with one aspect of the invention a invention a method is made available for the depletion of carbon dioxide in the air from a closed or partially closed unit of space, comprising the following steps:
  extraction of an air stream from the unit of space;
  feeding of the air stream into a membrane system containing at least one membrane module having a $CO_2/O_2$ selectivity of greater than 1;
  removal of the carbon dioxide permeated through the membrane;
  return of the air stream depleted of carbon dioxide in the membrane system into the unit of space.

In accordance with yet another aspect of the present invention, a method for the oxygen enrichment of air with simultaneous depletion of carbon dioxide in a closed or partially closed unit of space is provided, comprising the following steps:

extraction of a first air stream from the unit of space;

feeding of the first air stream into a membrane system containing at least one membrane module having a $CO_2/O_2$ selectivity of greater than 1;

removal of the carbon dioxide permeated through the membrane; return of the first air stream depleted of carbon dioxide in the membrane system into the unit of space;

enrichment of a second air stream with oxygen by means of an oxygen enrichment system, which produces an oxygen enriched and a nitrogen enriched air stream;

feeding of the oxygen enriched air stream into the unit of space; and separate removal of the nitrogen enriched air stream.

In accordance with still another aspect of the present invention a device is provided for the depletion of carbon dioxide in the air from a closed or partially closed unit of space, comprising:

arrangements for withdrawal of an air stream from the unit of space;

arrangements to feed the air stream into a membrane system containing at least one membrane module having a $CO_2/O_2$ selectivity of greater than 1;

arrangements for the removal of carbon dioxide from the permeate side of at least one membrane module;

arrangements for the return of the air stream depleted of carbon dioxide into the unit of space.

In accordance with a further aspect of the present invention a device for the oxygen enrichment of air with simultaneous depletion of carbon dioxide in closed or partially closed circulation loops is provided, comprising:

arrangements for extraction of a first air stream from the unit of space;

arrangements to feed the first air stream into a membrane system containing at least one membrane module having a $CO_2/O_2$ selectivity greater than 1;

arrangements to remove carbon dioxide from the permeate side of at least one membrane module;

arrangements to return the first air stream depleted of carbon dioxide in the membrane system into the unit of space;

an oxygen enrichment system which produces an oxygen enriched and a nitrogen enriched air stream from a fed-in second air stream;

arrangements to feed the oxygen enriched air stream into the unit of space; as well as arrangements to discharge the nitrogen enriched air stream.

Within the framework of the present invention the terms "oxygen enrichment" or "nitrogen enrichment" in each case signify an air composition which has a higher proportional volume percent of oxygen or nitrogen than natural air.

Under "carbon dioxide enriched" or "carbon dioxide depleted" an air composition is to be understood with elevated or decreased proportional volume percent of carbon dioxide relative to the starting air composition before treatment in the membrane system.

In accordance with aspects of the invention, by "membrane module" it is to be understood as a suitable geometric arrangement of membrane surfaces in the form of an assembly whose retentate side or upstream flow regions and permeate side or downstream flow regions are technically separated from each other, so that substantially continuous material crossover can essentially occur only by permeation through the membrane between retentate or stream sides and permeate or downstream sides. An exemplary membrane module usable in accordance with the invention can, based on the possibly high packing densities of more than 1000 $m^2/m^3$, preferably more than 1500 $m^2/m^3$ and especially more than 2000 $m^2/m^3$, be set up advantageously with very small dimensions.

A "membrane system" is understood to mean an arrangement of at least one, preferably a plurality of membrane modules fitted with suitable devices for feeding nor discharging air or other gas mixtures to the upstream side of the membranes or membrane modules, as well as devices for removal of permeated gases from the downstream side of the membranes or membrane modules.

In accordance with one aspect of the invention it has been shown that with the use of membrane systems control or adequate depletion of the carbon dioxide content can be achieved in room air in a simple, continuous and economic manner, without relying on adsorption cartridges which must be regularly exchanged and regenerated.

In accordance with another aspect of the invention, it is known that viable health and economic aspects require a meaningful oxygen enrichment on the one hand and the specific depletion of carbon dioxide, and if necessary, additional odorous substances not previously recognized in the art.

In one aspect, the present invention provides an effective and economic regulation of the $CO_2$ content of room air as well as, in one preferred embodiment, an essentially simultaneous enrichment of oxygen and depletion of carbon dioxide, with simultaneous enrichment of oxygen and depletion of carbon dioxide, with simultaneous depletion of other odorous substances and control of air moisture and temperature.

In yet another advantageous benefit of the present invention, the quota of air can be freed of bacteria or viruses, since these are effectively filtered out in the membrane modules that are utilized.

In accordance with a first aspect of the invention it has been surprisingly shown that control or depletion of the $CO_2$ content in room air can thereby be advantageously facilitated, so that the $CO_2$ can be continuously removed by selective permeation from the air of a unit of space in a circulation stream and again fed back by the use of selective membrane systems. This is especially surprising since the low proportional percentage of $CO_2$ in room air requires not only selective but also very effective gas separation.

In one aspect of the present invention it is recognized that one makes use of the relatively higher permeation of $CO_2$ molecules relative to oxygen through membranes. This predominantly kinetic effect also facilitates the highly selective and economical separation of gases with small proportional volume percentages.

According to one aspect of the present invention, a device or method is provided without an absorber which can effectively decrease the $CO_2$ content of air.

The method in accordance with one aspect of the invention or the device for depletion of $CO_2$ can be simply and effectively combined with other methods of improvement of air quality.

In connection with the combination of $CO_2$ depletion and oxygen enrichment, features described for $CO_2$ depletion are evidently also applicable to pure $CO_2$ depletion methods and devices.

In accordance with an aspect of the invention the combination of an efficient method of oxygen enrichment (or nitrogen depletion) by means of an oxygen enrichment system suitable for this exchange, together with the appropriate method for selective depletion of carbon dioxide, is provided.

To the applicant's surprise, it has been surprisingly shown that the combination of a continuously operating membrane system having membranes with high carbon dioxide selectivity. It was also surprisingly shown that in a continuously operating membrane system the bulk of the carbon dioxide can be taken from the loop, with for example a conventional pressure swing adsorption system or membrane process, through which the nitrogen can be obtained from an air circulation look, or the air enriched with oxygen, which is highly effective and has low operating costs for a continuously operating device.

According to the method in accordance with the invention for the depletion of $CO_2$ from the air, if necessary with simultaneous enrichment of oxygen, a (first) air stream is taken from a unit of space by means of suitable devices, for example by means of an appropriate exhaust device or a ventilation blower.

A unit of space in the sense of the invention can be any desired block of air essentially closed off or at least partially marked off from the surrounding environment, for example the air in a room, a building, a pressurized cabin in a motor vehicle, airplane, ship or streetcar, a tent, under a mosquito net, air-breathing systems, diving suits, respiratory protection equipment, an inhalation loop or suchlike, Since oxygen enriched air also has a higher specific weight, as a matter of principal environments which are open at the upper portion, such as tubs and the like are also conceivable in the sense of the present invention.

This first air stream taken from a unit of space is subsequently fed, for example, via suitably sized ad configured tubes, hoes or air channels, into a membrane system, which is fed to at least one membrane, conventionally a complete membrane module consisting of a suitable assembly of membranes preferably with high $CO_2/O_2$ selectivity. In one example, the selectivity of the membrane module or as the case may be of the membranes contained therein is greater than 1, for example 1.1 or 1.5. In one example the selectivity of the membrane module is greater than 2.

The $CO_2/O_2$ selectivity is understood here as the ratio of the relative permeation rates of $CO_2$ to $O_2$ through the membrane, so that a $CO_2/O_2$ selectivity of greater than 1 signifies that carbon dioxide permeates through the membrane faster than oxygen. A $CO_2/O_2$ selectivity of greater than 2 signifies that the permeation rate of carbon dioxide through the membrane is more than double the permeation rate of oxygen. In one embodiment the $CO_2/O_2$ selectivity for the membrane system employed in accordance with the invention is greater than 3, and for example greater than 5.

The person skilled in the art is aware that a higher selectivity is generally associated with a lower throughput through the membrane, while very open-pore systems with large throughput have a lower separation selectivity. In the selection of membranes for use here, appropriate compromise should be made for the actual purpose of the application.

In accordance with the invention, suitable membrane systems with $CO_2$ selective membrane modules contain membranes comprising carbon membranes, ceramic membranes, plastic membranes, as well as combinations and/or composites of these membranes. Appropriate selective membranes or membrane modules for a usable membrane system in the present invention are described for example in German Patent 10 013 457, WO 01/68533, German Patent 10 051 910, WO 02/32558 as well as German Patent 19 849 216 and WO 00/24500. The membranes, membrane systems and membrane modules described therein, if necessary after appropriate modification of their physicochemical properties, are suitable in principle as membranes and in membrane modules in the membrane system that is used in the present invention.

In the method and devices of the present invention membranes or membrane modules are preferred from pyrolytically prepared carbon-based material, like those described in WO 02/32558 and materials prepared by the methods described therein, including the ceramic materials mentioned there.

Other preferred materials for membranes and membrane modules in the method and devices of the present invention are described in German Patent Application 102 33 182.

In order to further increase the $CO_2$-selectivity of membranes used, the membrane materials mentioned above can additionally be surface modified into especially preferred embodiment forms of the invention, for example through oxidative or reductive surface treatment with suitable oxidizing or reducing agents, by means of impregnation with metal salts, especially transition metal salts, by incorporation of metals, especially transition or noble metals, or by coating of the membrane surfaces with membrane active plastic layers. Membranes employed in accordance with the invention can for example have the following active layers: polysulfone, polyoctylmethylsiloxane, polyetherimide, silicone, ethylcellulose, polyphenylene oxide, polycarbonate as well as combinations thereof.

The person skilled in the art will be aware that membrane system is a function of the total amount of air flow to be treated, so that a sufficient membrane surface is available to remove carbon dioxide in sufficient quantity from the first air stream by permeation through the membrane.

For this purpose it is also possible, for example, to combine a plurality of membrane modules in a membrane system. In that connection the combined membrane modules can have identical or different $CO_2/O_2$ selective, for example, the combination of one or a plurality of membrane modules with a smaller $CO_2/O_2$ selectivity for the pre-enrichment of $CO_2$ in the permeate with one or a plurality of modules with a $CO_2/O_2$ selectivity of greater than 1. If necessary the module may also have different membrane areas.

In the membrane system carbon dioxide is transferred through (permeates) the membrane predominantly on the basis of its higher permeation rate. The non-permeated, now carbon dioxide depleted remainder of the first air stream, which was withheld from the membrane, is for example discharged again via a retentate-side outlet port of the membrane system and via appropriate devices, for example blowers or pumps, and is returned in a circulation loop into the unit of space from which the first air stream was taken.

The carbon dioxide is removed through the membrane on the permeate side of the membrane/membrane module.

In one embodiment of the invention, the removal can be carried out by suction with, or application of, reduced pressure or vacuum to the permeate side of the membrane system by using suitable apparatus, e.g. pumps.

Moreover, the permeated carbon dioxide can also be removed by means of absorption in suitable liquid absorbers such as organic amines, alcohol amines and the like. Diethanolamine is one such example. The advantage of using an especially selective carbon dioxide absorbing organic liquid for $CO_2$ removal is that the membranes can be made open-pored. Thus, the throughput effectiveness of the method in accordance with the invention is enhanced.

In accordance with another embodiment of the invention, the permeated carbon dioxide is removed by means of a purge gas stream. For this purpose the purge gas is fed and discharged by means of suitable devices, for example, pumps and/or blowers. An exemplary purge gas is fresh air from outside the loop. However, any other suitable gas or gas mixture can be used, for example, nitrogen enriched air from the oxygen enrichment system.

The usable oxygen enrichment system can in accordance with the invention be any system known to the art for enrichment of oxygen from air. Examples of usable oxygen enrichment systems in accordance with the invention are pressure swing adsorption systems and hollow fiber membrane modules, which according to construction and the membrane material used can be operated with over pressure or reduced pressure, for example by application of a vacuum. Appropriate pressure swing adsorption apparatus and methods which can be used in the present invention are for example devices based on zeolite adsorption means such as are described in U.S. Pat. No. 4,685,939. Other suitable pressure swing adsorption devices, which can be used as oxygen enrichment systems in the present invention, are described for example in U.S. Pat. No. 5,890,366, in U.S. Pat. No. 4,896,514 as well as U.S. Pat. No. 4,867,766.

Insofar as a pressure swing adsorption system is used in the present invention the pressure swing adsorption system preferably comprises a compressor for compression of the second air stream, e.g. to a pressure of 0.12 MPa to 1.0 Mpa, preferably 0.15 MPa to 0.25 MPa; and one to ten, preferably 2 adsorption chambers containing zeolite molecular sieves per unit. For large scale installations a plurality of these units can be employed.

Additionally, in accordance with the invention, pressure swing adsorption systems operating at reduced pressure are also usable, in which case a vacuum pump is usually employed instead of a compressor.

In accordance with the invention hollow, fiber membrane based systems usable as oxygen enrichment systems are for example described in German Patent 19 645 764 as well as U.S. Pat. No. 5,158,584. Also plastic membrane separation systems such as are described in U.S. Pat. No. 6,427,484 are usable in the method and the device of the present invention.

Further, membrane-based air separation devices relying on zeolite membranes, zeolite mixed-matrix systems, carbon or polymer membranes, can be used for the oxygen enrichment system employed in accordance with the invention. It is preferred that a second air stream is fed to the oxygen enrichment system in suitable fashion, from where the oxygen enrichment system produces an oxygen-enriched air stream and a nitrogen-enriched air stream. The nitrogen enriched air stream is suitably bled off separately or rejected as the case may be.

The oxygen enriched air stream is additionally fed to, or together with, the carbon dioxide depleted first air stream to the unit of space. The carbon dioxide depleted first air stream is united with the oxygen enriched air stream from the oxygen enrichment system before being returned to the unit of space.

In one embodiment of the invention the device in accordance with the invention comprises $O_2$ sensors, $CO_2$ sensors or air quality sensors as well as coupled therewith computer-aided control devices for adjustment of the stream volumes of the air streams returned to the unit of space from the membrane system and the oxygen enrichment system. By means of one of this type of device it is possible for example, to establish and maintain a defined average oxygen content and/or carbon dioxide content of the air in the unit of space.

The second air stream can originate from fresh or surrounding air, for example in spaces or buildings, or outside air.

In accordance with one embodiment of the method, in accordance with the invention or the device according to the invention, the second air stream is at least also partly removed from the unit of space, from the first air stream before the membrane system or from the carbon dioxide depleted first air stream. The partitioning of the second air stream from the unit of space or from the first air stream can be carried out by means of any devices known to a person skilled in the art of splitting up gas volume streams.

In accordance with the inventional, it is further valuable for economic reasons, that the first air stream has a larger volume than the second air stream. The volume ratio of the first air stream to the second air stream lies in the range from 500:1 to 2:1.

In another embodiment the first air stream and the second air stream or the oxygen enriched air stream resulting therefrom can be passed across an active carbon filter in order to remove unwanted odorous substances, dust or the like. This serves especially for the pre-purification of the air, so as to maintain constant membrane performance and prevent premature blocking of the pores.

It is provided moreover in one embodiment, if necessary, to temper, moisten or to climatize individual air streams.

For dwindling separation effectiveness resulting from impurities, sediment, collections of moisture or blockages of the membrane pores in accordance with the inventive membrane system the membranes can from time to time be cleaned or regenerated. In the case of electrically conductive membrane modules e.g. for carbon-based membranes, electrically inductive resistance heating can for example be carried out whereby the membranes are heated so that impurities are evaporated or oxidatively broken down. However, other heat sources are usable in order to clean the membranes thermally, such as hot air blowers, radiators, infra-red radiation, heat pipe radiation, heat-ray tubes, fluorescent lamps, electrical heating lines, induction heating and suchlike.

Also the cleaning by means of compressed air or passing solvents through the membrane systems are usable in a few embodiments. Moreover, the membranes can be cleaned and if necessary sterilized by means of suitable oxidation means, for example ozone or gamma rays.

An exemplary embodiment of a combination method in accordance with the invention is furthermore illustrated in the attached flow diagram in accordance with FIG. 1. In particular, FIG. 1 shows an essentially closed unit of space AB, from which a first air stream 1a with elevated carbon dioxide proportion is extracted and fed to the purge gas membrane system M1.

In the purge gas membrane system, carbon dioxide permeates preferentially through the membrane module (not shown) due to its higher permeation rate, and carbon dioxide depleted air remains on the retentate side of the membrane module. This held back air streams 1b depleted in $CO_2$, is returned again into the unit of space AB.

The $CO_2$ (or the permeate sided appearing air with a significantly increased proportion of $CO_2$) permeated through the membranes of the membrane module is removed from the purge gas membrane system M1, by means of a purge gas stream 1c, as carbon dioxide loaded purge gas stream 1d.

Parallel to this a second air stream 2a is fed into an oxygen enrichment system M2, which produces a nitrogen enriched air stream-2c, which is removed, as well as an oxygen enriched air stream-2b, which is fed into the unit of space AB, in order to raise the relative oxygen content of the air there.

The invention is further described by the following numbered paragraphs:

1. A method for the depletion of carbon dioxide in the air from a closed or partially closed unit of space, comprising the following steps:
   Extraction of an air stream from the unit of space;
   Feeding of the air stream into a membrane system containing at least one membrane module having a $CO_2/O_2$ selectivity of greater than 1;
   Removal of the carbon dioxide permeated through the membrane;
   Return of the air stream depleted of carbon dioxide in the membrane system into the unit of space.

2. A method for the oxygen enrichment of air with simultaneous depletion of carbon dioxide in a closed or partially closed unit of space, comprising the following steps:
   Extraction of a first air stream from the unit of space;
   Feeding of the first air stream into a membrane system containing at least one membrane module having a $CO_2/O_2$ selectivity of greater than 1;
   Removal of the carbon dioxide permeated through the membrane;
   Return of the first air stream depleted of carbon dioxide in the membrane system into the unit of space;
   Enrichment of a second air stream with oxygen by means of an oxygen enrichment system, which produces an oxygen enriched and a nitrogen enriched air stream;
   Feeding of the oxygen enriched air stream into the unit of space; and
   Separate removal of the nitrogen enriched air stream.

3. The method according to Paragraph 1 or 2, characterized in that the permeated carbon dioxide is removed by means of reduced pressure, vacuum or by purging the permeate side of at least one membrane module with a purge gas stream of the permeate side of the membrane module.

4. The method according to Paragraph 1 or 2, characterized in that the permeated carbon dioxide is discharged by absorption in suitable absorber liquids.

5. The method according to any one of Paragraphs 2 through 4, characterized in that the carbon dioxide depleted first air stream is cleaned before return into the unit of space with the oxygen enriched air stream from the oxygen enrichment system.

6. The method according to any one of Paragraphs 2 through 5, characterized in that the second air stream originates at least partially from the unit of space, from the first air stream before the purge gas membrane system or the carbon dioxide depleted first air stream.

7. The method according to any one of the preceding Paragraphs, characterized in that the unit of space is selected from a building, a room, a pressurized cabin in a motor vehicle, airplane, ship or streetcar, a tent, under a mosquito net, from air-breathing systems, diving suits, respiratory protection equipment, or an inhalation loop.

8. The method according to any one of the preceding Paragraphs, characterized in that at the least one membrane module contains carbon membranes, ceramic membranes, plastic membranes, and combinations and/or composites of these membranes.

9. The method according to any one of Paragraphs 2 through 10 characterized in that the oxygen enrichment system used is a pressure swing adsorption system, a hollow fiber membrane module or a membrane-based air separation device on the basis of zeolite membranes, zeolite mixed-matrix systems, carbon or polymer membranes.

10. The method according to any one of Paragraphs 4 through 9, characterized in that the purge gas is air which is, if necessary, tempered and/or climatized.

11. The method according to any one of Paragraphs 2 through 10, characterized in that the volume ratio of the first air stream to the second air stream lies in the range from 500:1 to 2:1.

12. A device for the depletion of carbon dioxide in the air from a closed or partially closed unit of space, comprising:
   Arrangements for withdrawal of an air stream from the unit of space;
   Arrangements to feed the air stream into a membrane system containing at least one membrane module having a $CO_2/O_2$ selectivity greater than 1;
   Arrangements for the removal of carbon dioxide from the permeate side of at least one module;
   Arrangements for the return of the air stream depleted of carbon dioxide in the membrane system into the unit of space.

13. A device for the enrichment of oxygen from air by simultaneous depletion of carbon dioxide in closed or partially closed loops comprising:
   Arrangements for extraction of a first air stream from the unit of space;
   Arrangements to feed the first air stream into a membrane system containing at least one membrane module having a $CO_2/O_2$ selectivity of greater than 1;
   Arrangements to remove carbon dioxide from the permeate side of at least one membrane module;
   Arrangements to return the first air stream depleted of carbon dioxide into the unit of space;
   An oxygen enrichment system, which produces an oxygen enriched and a nitrogen enriched air stream from an introduced second air stream;
   Devices for feeding the oxygen enriched air stream into the unit of space; as well as
   Devices for discharge of the nitrogen enriched air stream.

14. The device according to Paragraph 12 or 13, characterized in that the devices for removal of carbon dioxide comprise devices for provision of reduced pressure or vacuum on the permeate side of the membrane system.

15. The device according to Paragraph 12 or 13, characterized in that the devices for removal of carbon dioxide comprise devices for feeding and discharge of purge gas in the membrane system.

16. The device according to any one of Paragraphs 12 through 15, characterized in that the oxygen enrichment system is a pressure swing adsorption system, a hollow fiber membrane module or a membrane-based air separation device on the basis of zeolite membranes, zeolite mixed-matrix systems, carbon or polymer membranes.

17. The device according to Paragraph 16, characterized in that per device the pressure swing adsorption system comprises;
   A compressor for compression of the second air stream; and
   One to 10 adsorption chambers containing zeolite molecular sieves.

18. The device according to any one of Paragraphs 12 through 17, characterized in that the membrane system comprises at least one membrane selected from carbon membranes, ceramic membranes, plastic membranes, and combinations and/or composites of these membranes.

19. The device according to any one of Paragraphs 14 through 18, characterized in that the device comprises $CO_2$ sensors, $O_2$ sensors or air quality sensors as well as computer-aided control devices coupled therewith for adjustment of the volume streams of the air streams returning from the membrane system and the oxygen enrichment system into the unit of space.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method for the depletion of carbon dioxide in the air from a closed or partially closed unit of space, comprising the following steps:
    extracting an air stream from a unit of space;
    feeding the air stream into a membrane system containing at least one membrane module having a $CO_2/O_2$ selectivity of greater than 1, wherein the at least one membrane module contains carbon membranes, ceramic membranes, and combinations and/or composites of these membranes;
    removing permeated carbon dioxide which has permeated through a membrane;
    returning the air stream depleted of the carbon dioxide in the membrane system into the unit of space.

2. A method for the oxygen enrichment of air with simultaneous depletion of carbon dioxide in a closed or partially closed unit of space, comprising the following steps:
    extracting a first air stream from a unit of space;
        feeding of the first air stream into a membrane system containing at least one membrane module having a $CO_2/O_2$ selectivity of greater than 1, wherein the at least one membrane module contains carbon membranes, ceramic membranes, and combinations and/or composites of these membranes;
        removing permeated carbon dioxide which has permeated through a membrane;
        returning of a first air stream depleted of carbon dioxide in the membrane system into the unit of space;
        enriching a second air stream with oxygen by means of an oxygen enrichment system, which produces an oxygen enriched and a nitrogen enriched air stream;
    feeding of the oxygen enriched air stream into the unit of space; and
    separating removal of the nitrogen enriched air stream.

3. The method according to claim 1, wherein the permeated carbon dioxide is removed by means of reduced pressure, vacuum or purging a permeate side of at least one membrane module with a purge gas stream of the permeate side of the membrane module.

4. The method according to claim 2, wherein the permeated carbon dioxide is discharged by absorption in suitable absorber liquids.

5. The method according to claim 4, wherein the carbon dioxide depleted first air stream is cleaned before return into the unit of space with the oxygen enriched air stream from the oxygen enrichment system.

6. The method according to claim 5, wherein the second air stream originates at least partially from the unit of space, from the first air stream before the membrane system or the carbon dioxide depleted first air stream.

7. The method according to claim 6, wherein the unit of space is selected from a building, a room, a pressurized cabin in a motor vehicle, airplane, ship or streetcar, a tent, a mosquito net, air-breathing systems, diving suits, respiratory protection equipment, and an inhalation loop.

8. The method according to claim 2, wherein the oxygen enrichment system used is a pressure swing adsorption system, a hollow fiber membrane module or a membrane—based air separation device on a basis of zeolite membranes, zeolite mixed—matrix systems, carbon or polymer membranes.

9. The method according to claim 3, wherein the purge gas is air which is, tempered or climatized.

10. The method according to claim 2, wherein the volume ratio of the first air stream to the second air stream is in the range from 500:1 to 2:1.

11. A device for depletion of carbon dioxide in air from a closed or partially closed unit of space, comprising:
    a first part for withdrawal of an air stream from the unit of space;
    a second part to feed the air stream into a membrane system containing at least one membrane module having a $CO_2/O_2$ selectivity greater than 1, wherein the at least one membrane module contains carbon membranes, ceramic membranes, and combinations and/or composites of these membranes;
    a third part for the removal of carbon dioxide from the permeate side of at least one module;
    a fourth part for the return of the air stream depleted of carbon dioxide in the membrane system into the unit of space.

12. A device for the enrichment of oxygen from air by simultaneous depletion of carbon dioxide in closed or partially closed loops comprising:
    a first part for extraction of a first air stream from the unit of space;
    a second part to feed the first air stream into a membrane system containing at least one membrane module having a $CO_2/O_2$ selectivity of greater than 1, wherein the at least one membrane module contains carbon membranes, ceramic membranes, and combinations and/or composites of these membranes;
    a third part to remove carbon dioxide from the permeate side of at least one membrane module;
    a fourth part to return the first air stream depleted of carbon dioxide into the unit of space;
    an oxygen enrichment system, which produces an oxygen enriched and a nitrogen enriched air stream from an introduced second air stream;
    a fifth part for feeding the oxygen enriched air stream into the unit of space; as well as
    a sixth part for discharge of the nitrogen enriched air stream.

13. The device according to claim 11, wherein the third part comprise devices for provision of reduced pressure or vacuum on the permeate side of the membrane system.

14. The device according to claim 11, wherein the third part comprise devices for feeding and discharging of purge gas in the membrane system.

15. The device according to claim 12, wherein the oxygen enrichment system is a pressure swing adsorption system, a hollow fiber membrane module or a membrane based air separation device on the basis of zeolite membranes, zeolite mixed-matrix systems, carbon or polymer membranes.

16. The device according to claim 15, wherein per device the pressure swing adsorption system comprises;
    a compressor for compression of the second air stream; and
    one to 10 adsorption chambers containing zeolite molecular sieves.

17. The device according claim 16, wherein the device comprises $CO_2$ sensors, $O_2$ sensors or air quality sensors as well as computer-aided control devices coupled therewith for adjustment of the volume streams of the air streams returning from the membrane system and the oxygen enrichment system into the unit of space.

* * * * *

UNITED STATES PATENT AND TRADEMARK OFFICE
CERTIFICATE OF CORRECTION

| | |
|---|---|
| PATENT NO. | : 7,601,202 B2 |
| APPLICATION NO. | : 11/176611 |
| DATED | : October 13, 2009 |
| INVENTOR(S) | : Noack et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 747 days.

Signed and Sealed this

Fifth Day of October, 2010

David J. Kappos
*Director of the United States Patent and Trademark Office*